(12) United States Patent
Yung

(10) Patent No.: US 6,385,713 B2
(45) Date of Patent: May 7, 2002

(54) MICROPROCESSOR WITH PARALLEL INVERSE SQUARE ROOT LOGIC FOR PERFORMING GRAPHICS FUNCTION ON PACKED DATA ELEMENTS

(75) Inventor: Robert Yung, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/756,023

(22) Filed: Jan. 4, 2001

Related U.S. Application Data

(62) Division of application No. 09/417,874, filed on Oct. 13, 1999, now abandoned, which is a division of application No. 08/722,442, filed on Oct. 10, 1996, now Pat. No. 5,996,066.

(51) Int. Cl.[7] .............................................. G06F 9/302
(52) U.S. Cl. .................... 712/22; 708/500; 708/502; 712/222
(58) Field of Search ................................. 708/500, 502; 712/222, 22

(56) References Cited

U.S. PATENT DOCUMENTS 5,206,823 A * 4/1993 Hesson ........................ 708/502
5,847,979 A * 12/1998 Wong et al. ................ 708/500

* cited by examiner

*Primary Examiner*—Kenneth S. Kim
(74) *Attorney, Agent, or Firm*—Townsend and Townsend and Crew LLP

(57) ABSTRACT

An optimized, superscalar microprocessor architecture for supporting graphics operations in addition to the standard microprocessor integer and floating point operations. A number of specialized graphics instructions and accompanying hardware for executing them are disclosed to optimize the execution of graphics instruction with minimal additional hardware for a general purpose CPU.

6 Claims, 9 Drawing Sheets

MICROPROCESSOR WITH PARALLEL INVERSE SQUARE ROOT LOGIC FOR PERFORMING GRAPHICS FUNCTION ON PACKED DATA ELEMENTS

This application is a division of and claims the benefit of U.S. application Ser. No. 09/417,874, filed Oct. 13, 1999, now abandoned which is a divisional of U.S. application Ser. No. 08/722,442, filed Oct. 10, 1996, now issued U.S. Pat. No. 5,996,066 the disclosure of which are incorporated by reference.

FIELD OF THE INVENTION

The present invention relates to a superscalar central processing unit (CPU) having integrated graphics capabilities.

BACKGROUND OF THE INVENTION

Historically, the CPU's in early prior art computer systems were responsible for both graphics as well as non-graphics functions. Some later prior art computer systems provide auxiliary display processors. Other later prior art computer systems would provide auxiliary graphics processors. The graphics processors would perform most of the graphics processing for the general purpose CPU.

In the case of microprocessors, as the technology continues to allow more and more circuitry to be packaged in a small area, it is increasingly more desirable to integrate the general purpose CPU with built-in graphics capabilities instead. Some modern prior art computer systems have begun to do that. However, the amount and nature of graphics functions integrated in these modern prior art computer systems typically are still very limited and involve trade-offs. Particular graphics functions known to have been integrated include frame buffer checks, add with pixel merge, and add with Z-buffer merge. Much of the graphics processing on these modern prior art systems remain being processed by the general purpose CPU without additional built-in graphics capabilities, or by the auxiliary display/graphics processors.

One implementation of a RISC microprocessor incorporating graphics capabilities is the Motorola MC88110. This microprocessor, in addition to its integer execution units, and multiply, divide and floating point add units, adds two special purpose graphics units. The added graphics units are a pixel add execution unit, and a pixel pack execution unit. The Motorola processor allows multiple pixels to be packed into a 64-bit data path used for other functions in the other execution units. Thus, multiple pixels can be operated on at one time. The packing operation in the packing execution unit packs the pixels into the 64-bit format. The pixel add operation allows the adding or subtracting of pixel values from each other, with multiple pixels being subtracted at one time in a 64-bit field. This requires disabling the carry normally generated in the adder on each 8-bit boundary. The Motorola processor also provides for pixel multiply operations which are done using a normal multiply unit, with the pixels being placed into a field with zeros in the high order bits, so that the multiplication result will not spill over into the next pixel value representation.

The Intel I860 microprocessor incorporated a graphics unit which allowed it to execute Z-buffer graphics instructions. These are basically the multiple operations required to determine which pixel should be in front of the others in a 3-D display. The Intel MMX instruction set provides a number of partitioned graphics instructions for execution on a general purpose microprocessor, expanding on the instructions provided in the Motorola MC88110.

It would be desirable to provide the capability to perform other graphics functions more rapidly using packed, partitioned registers with multiple pixel values.

SUMMARY OF THE INVENTION

The present invention provides an optimized, superscalar microprocessor architecture for supporting graphics operations in addition to the standard microprocessor integer and floating point operations. A number of specialized graphics instructions and accompanying hardware for executing them are disclosed to optimize the execution of graphics instruction with minimal additional hardware for a general purpose CPU.

Particular logic operations often needed for graphics operations are provided for in the invention. In particular, a single instruction calculates the value of one divided by the square root of the operand, and another single instruction does both a multiply of two partitioned values, and an add with a separate, third value, with a masking capability. Each of these instructions operate on multiple partitioned pixel values in a single register.

A number of instructions are provided for moving around the partitioned pixel fields. In particular, an extraction operation allows designated fields of a source register to be stored in a destination register. Alternately, designated bits could be extracted. The designated fields or bits can be indicated by a mask register. In addition, a conditional move, load or execution can be performed using a mask register to indicate which of the partitioned fields or bits is to be operated on.

Another instruction detects either a leading one or leading zero and returns a pointer to this position. Alternately, a particular pattern can be detected using a string search. This is useful for encryption and data compression/decompression.

Another specialized instruction allows the interchange of addresses or data between a floating point and integer register file. Another instruction provides for partitioned shifting with a mask, wherein multiple, partitioned fields are each internally shifted in parallel without shifting into the next partitioned field, with the mask either designating which fields to shift, or storing the bits shifted out of one or more fields.

The present invention also provides a load from the memory location to a graphics register wherein load operation also increments the address register. The present invention also provides an instruction for adding the absolute value of a variable to the variable itself for multiple, partitioned variables.

The invention also provides a partitioned divide operation in a single instruction.

For a fuller understanding of the present invention, reference should be made to following description taken in conjunction with the accompanying drawings.

DESCRIPTION OF THE PREFERRED EMBODIMENT

Overall CPU Architecture

Figure 1:
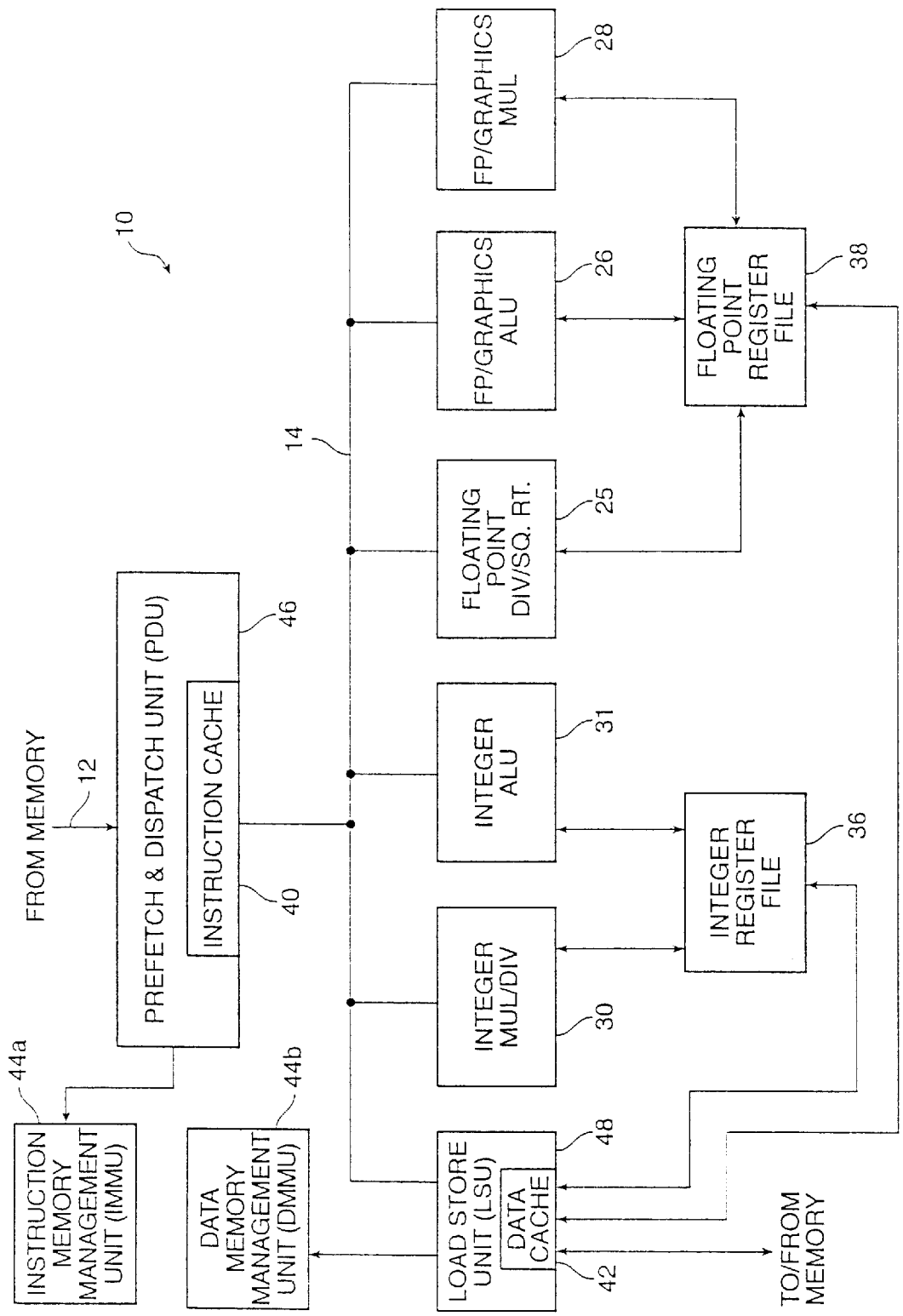
FIG. 1 illustrates the CPU of an exemplary graphics computer system incorporating the teachings of the present invention.

Referring now to FIG. 1, a block diagram illustrating the CPU of an exemplary graphics computer system incorporating the teachings of the present invention is shown.

As illustrated, a CPU 10 includes a prefetch and dispatch unit (PDU) 46 connected to an instruction cache 40. Instructions are fetched by this unit from either the cache or main memory on a bus 12 with the help of an instruction memory management unit (IMMU) 44a. Data is fetched either from main memory or from a data cache 42 using a load storage unit (LSU) 48 working with a data memory management unit (DMMU) 44b.

PDU 46 issues up to four instructions in parallel to multiple pipelined execution units along a pipeline bus 14. Integer operations are sent to one of two integer execution units (IEU), an integer multiply or divide unit 30 and an integer ALU 31. These two units share access to an integer register file 36 for storing operands and results of integer operations.

Separately, three floating point operation units are included. A floating point divide and square root execution unit 25, a floating point/graphics ALU 26 and a floating point/graphics multiplier 28 are coupled to pipeline bus 14 and share a floating point register file 38. The floating point register file stores the operands and results of floating point and graphics operations.

The data path through the floating point units 26 and 28 has been extended to 64 bits in order to be able to accommodate 8—8 bit pixel representations, (or 4–16 bit, or 2–32 bit representations) in parallel. Thus, the standard floating point path of 53 bits plus 3 extra bits (guard, round and sticky or GRS) has been expanded to accommodate the graphics instructions in accordance with the present invention. The invention could be applied to any data size. For example, 64 bit register and operation sizes could be used, with an instruction operating on multiple 64 bit quantities in series, or by using a larger register and bus size.

Additionally, the IEU also performs a number of graphics operations, and appends address space identifiers (ASI) to the addresses of load/store instructions for the LSU 48, identifying the address spaces being accessed. LSU 48 generates addresses for all load and store operations. LSU 48 also supports a number of load and store operations, specifically designed for graphics data. Memory references are made in virtual addresses. The MMUs 44a–44b include translation look-aside buffer (TLBs) to map virtual addresses to physical addresses.

Two Partitioned Graphics Execution Paths

Figure 2:
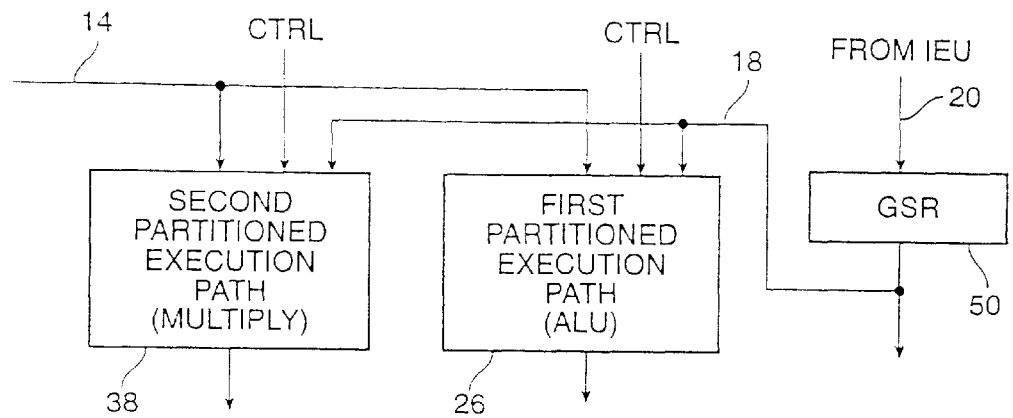
FIG. 2 illustrates the two partitioned execution paths of one embodiment of the graphics circuitry added in FIG. 1.

FIG. 2 shows the floating point/graphics execution units 26 and 28 in more detail. FIG. 2 illustrates that these provide two partitioned execution paths for graphics instructions, a first partitioned execution path in unit 26 and a second partitioned execution path in unit 28. Both of these paths are connected to the pipeline bus 14 connected to the prefetch and dispatch unit 46. The division of hardware and instructions between two different execution paths allows two independent graphics instructions to be executed in parallel for each cycle of a pipeline. The partitioning of instructions and hardware between the two paths has been done to optimize throughput of typical graphics applications.

Also shown is a graphics status register (GSR) 50. This register is provided external to the two paths, since it stores the scale factor and alignment offset data used by graphics instructions in both execution paths. Each execution path is provided the information in the graphics status register along bus 18. The graphics status register is written to along a bus 20 by the IEU.

Graphics Status Register

Figure 3:
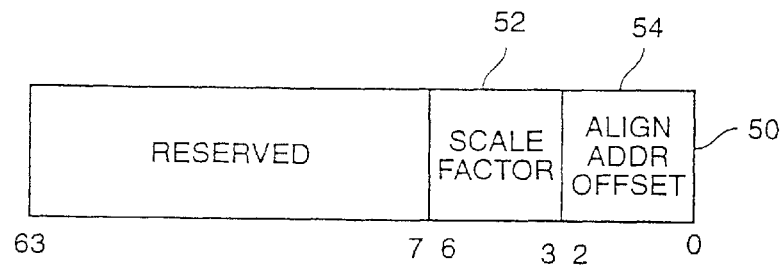
FIG. 3 illustrates the Graphics Status Register (GSR).

Referring now to FIG. 3, a diagram illustrating the relevant portions of one embodiment of the graphics status register (GSR) is shown. In this embodiment, the GSR 50 is used to store an offset in bits 0–2, and a scale factor in bits 3–8, with the remaining bits reserved. The offset is the least significant three bits of a pixel address before alignment (alignaddr_offset) 54, and the scaling factor is used for pixel formatting (scale_factor) 52. The alignaddr_offset 54 is stored in bits GSR[2:0], and the scale_factor 52 is stored in bits GSR[6:3]. The GSR can also have a field for storing bits from a shift operation, as discussed below, indicating the bits shifted or simply flagging that a shift has occurred. Two special instructions RDASR and WRASR are provided for reading from and writing into the GSR 50.

FP/Graphics ALU 26

Figure 4:
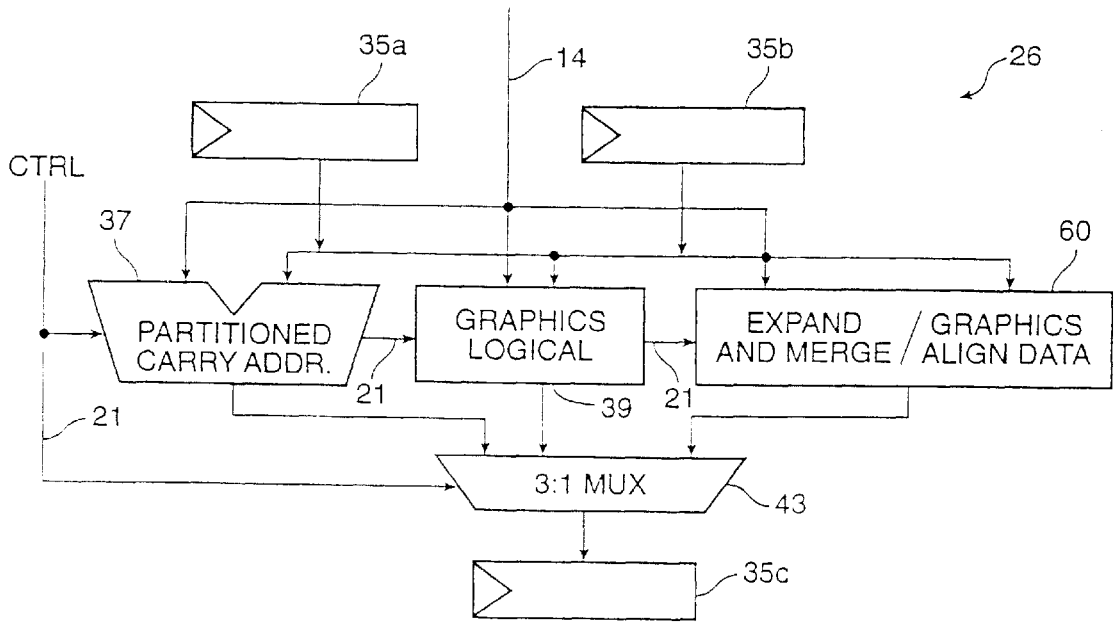
FIG. 4 illustrates the first ALU partitioned execution path of FIG. 2 in further detail.

Referring now to FIG. 4, a block diagram illustrating the relevant portions of one embodiment of the first partitioned execution path in unit 26 is shown.

Pipeline bus 14 provides the decoded instructions from PDU 46 to one of three functional circuits. The first two functional units, partitioned carry adder 37 and graphics logical circuit 39, contain the hardware typically contained in a floating point adder and an integer logic unit. The circuitry has been modified to support graphics operations. An additional circuit 60 has been added to support both graphics expand and merge operations and graphics data alignment operations. Control signals on lines 21 select which circuitry will receive the decoded instruction, and also select which output will be provided through a multiplexer 43 to a destination register 35c. Destination register 35c, and operand register 35a and 35b are illustrations of particular registers in the floating point register file 38 of FIG. 1.

At each dispatch, the PDU 46 may dispatch either a graphics data partitioned add/subtract instruction, a graphics data alignment instruction, a graphics data expand/merge instruction or a graphics data logical operation to unit 26. The partitioned carry adder 37 executes the partitioned graphics data add/subtract instructions, and the expand and merge/graphics data alignment circuit 60 executes the graphics data alignment instruction using the alignaddr_ offset stored in the GSR 50. The graphics data expand and merge/graphics data alignment circuit 60 also executes the graphics data merge/expand instructions. The graphics data logical operation circuit 39 executes the graphics data logical operations.

The functions and constitutions of the partitioned carry adder 37 are similar to simple carry adders found in many integer execution units known in the art, except the hardware are replicated multiple times to allow multiple additions/subtractions to be performed simultaneously on different partitioned portions of the operands. Additionally, the carry chain can be optionally broken into smaller chains.

The functions and constitutions of the graphics data logical operation circuit 39 are similar to logical operation circuits found in many integer execution units known in the art, except the hardware are replicated multiple times to allow multiple logical operations to be performed simultaneously on different partitioned portions of the operands. Thus, the graphics data logical operation circuit 39 will also not be further described.

FP/Graphics Multiply Unit 28

Figure 5:
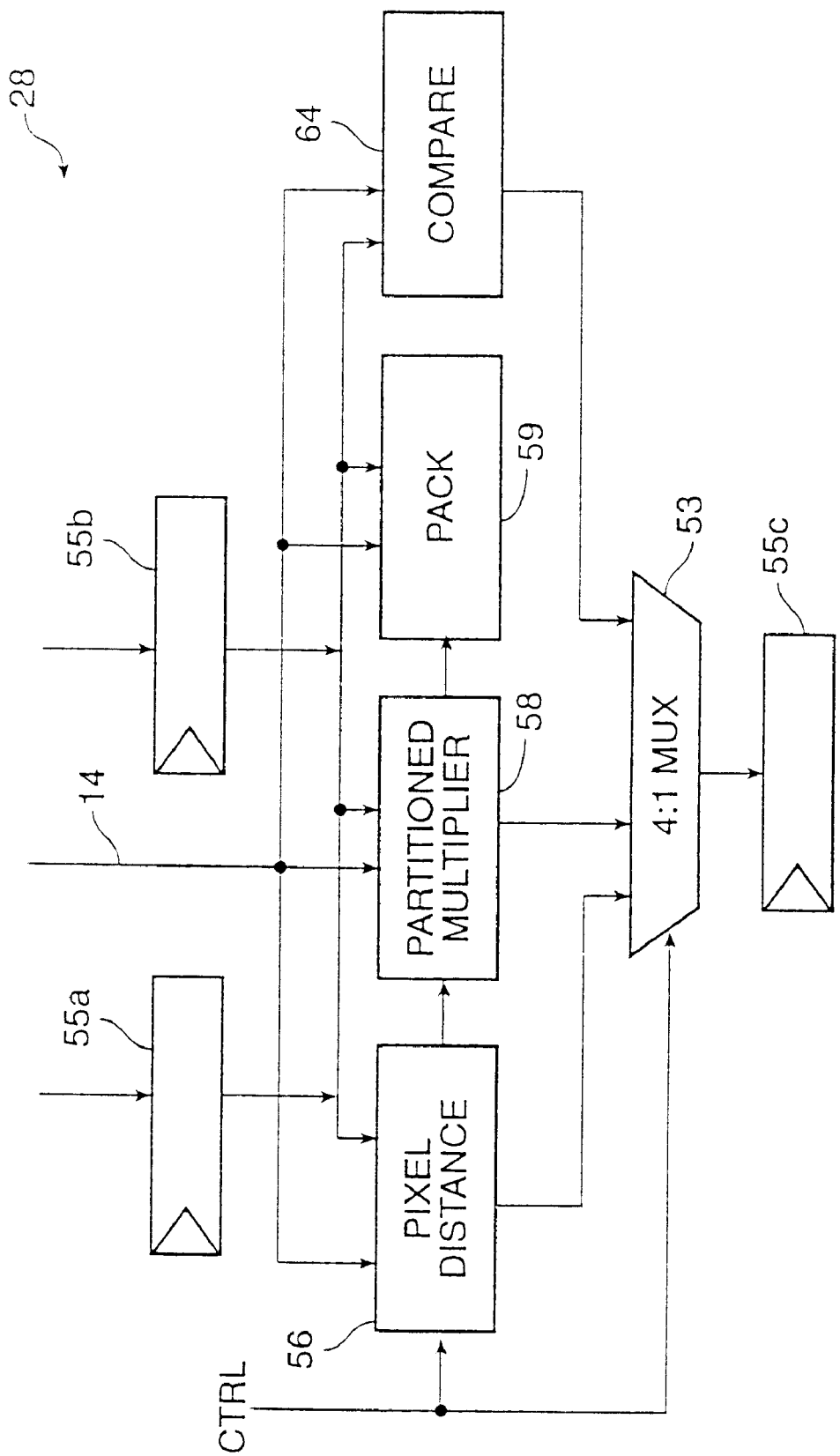
FIG. 5 illustrates the second multiply partitioned execution path of FIG. 2 in further detail.

Referring now to FIG. 5, a block diagram illustrating the relevant portion of one embodiment of the FP/graphics multiply unit 28 in further detail is shown. In this embodiment, multiply unit 28 comprises a pixel distance computation circuit 56, a partitioned multiplier 58, a graphics data packing circuit 59, and a graphics data compare circuit 64, coupled to each other as shown. Additionally, a number of registers 55a–55c (in floating point register file 38) and a 4:1 multiplexer 53 are coupled to each other and the previously-described elements as shown. At each dispatch, the PDU 46 may dispatch either a pixel distance computation instruction, a graphics data partitioned multiplication instruction, a graphics data packing instruction, or a graphics data compare instruction to unit 28. The pixel distance computation circuit 56 executes the pixel distance computation instruction. The partitioned multiplier 58 executes the graphics data partitioned multiplication instructions. The graphics data packing circuit 59 executes the graphics data packing instructions. The graphics data compare circuit 64 executes the graphics data compare instructions.

The functions and constitutions of the partitioned multiplier 58, and the graphics data compare circuit 64 are similar to simple multipliers and compare circuits found in many integer execution units known in the art, except the hardware are replicated multiple times to allow multiple multiplications and comparison operations to be performed simultaneously on different partitioned portions of the operands. Additionally, multiple multiplexers are provided to the partitioned multiplier for rounding, and comparison masks are generated by the comparison circuit 64.

The present invention is being described with an embodiment of the graphics circuitry having two independent partitioned execution paths, and a particular allocation of graphics instruction execution responsibilities among the execution paths. However, it will be appreciated that certain aspects of the present invention may be practiced with one or more independent partitioned execution paths, and the graphics instruction execution responsibilities allocated in any number of manners.

Data Formats

Figure 6A:
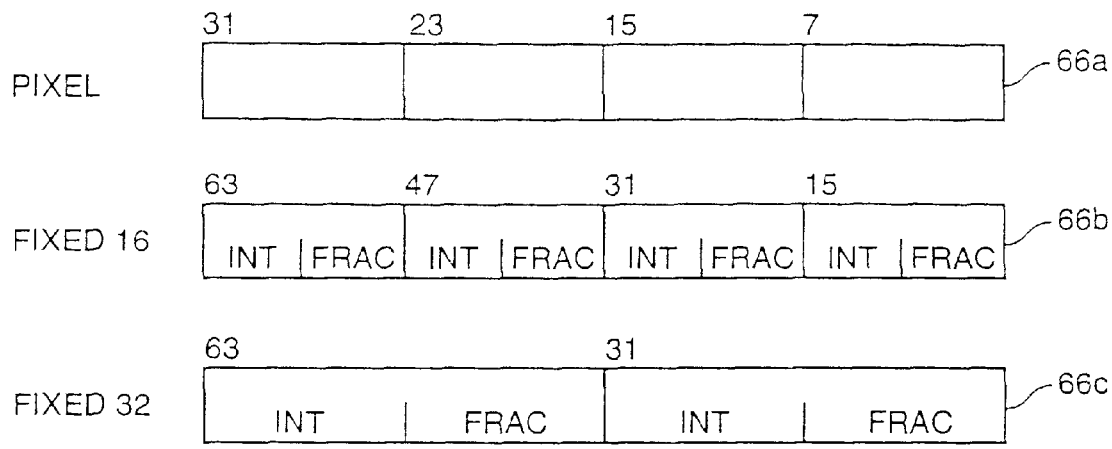
FIGS. 6A–6B illustrate the graphics data formats and the graphics instruction formats.
Figure 6B:
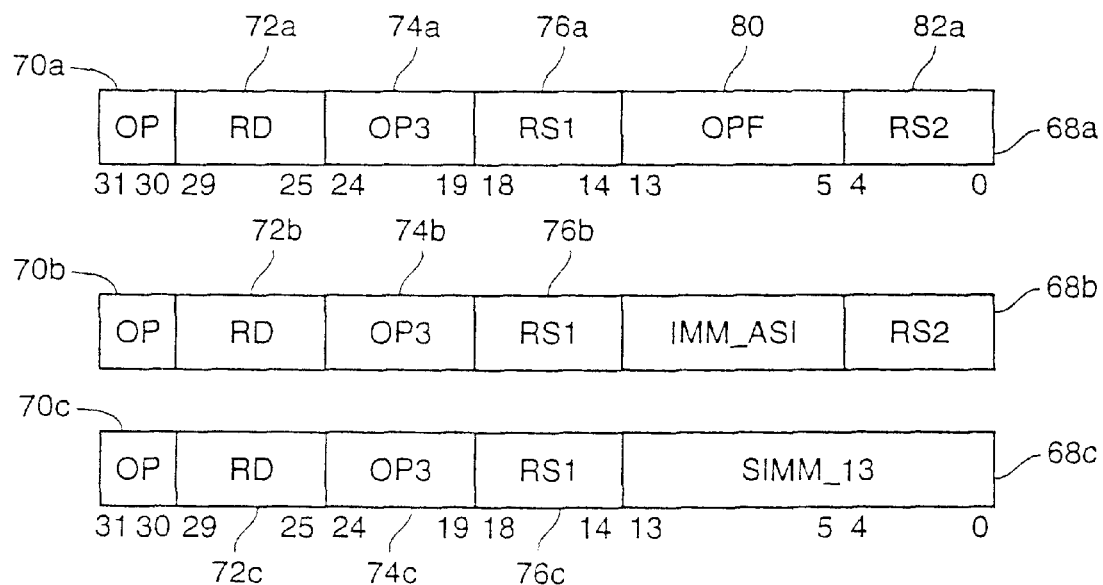

Referring now to FIGS. 6a–6b, two diagrams illustrating the graphics data formats and the graphics instruction formats are shown. As illustrated in FIG. 6a, the exemplary CPU 10 supports three graphics data formats, an eight bit format (Pixel) 66a, a 16 bit format (Fixed16) 66b, and a 32 bit format (Fixed32) 66c. Thus, four pixel formatted graphics data are stored in a 32-bit word, 66a, whereas either four Fixed16 or two Fixed32 formatted graphics data are stored in a 64-bit word 66b or 66c. Alternately, 8 Fixed8 formatted graphics data words could be stored in a 64-bit word. Image components are stored in either the Pixel or the Fixed16 format 66a or 66b. Standard audio data formats are also supported. Intermediate results are stored in either the Fixed8, Fixed16 or the Fixed32 format 66b or 66c. Alternately, any other size of data format may be used, including 64 bit or larger formats. Typically, the intensity values of a pixel of an image, e.g., the alpha, green, blue, and red values ($\alpha$, G, B, R), are stored in the Pixel format 66a. These intensity values may be stored in a band interleaved format where the various color components of a point in the image are stored together, or in a band sequential format where all of the values for one component are stored together. The Fixed16 and Fixed32 formats 66b–66c provide enough precision and dynamic range for storing intermediate data computed during filtering and other simple image manipulation operations performed on pixel data.

Instruction Formats

As illustrated in FIG. 6b, the CPU 10 supports three graphics instruction formats 68a–68c. Regardless of the instruction format 68a–68c, the two most significant bits [31:30] 70a–70c provide the primary instruction format identification, and bits [24:19] 74a–74c provide the secondary instruction format identification for the graphics instructions. Additionally, bits [29:25] (rd) 72a–72c identify the destination (third source) register of a graphics (block/partial conditional store) instruction, whereas, bits [18:14] (rs1) 76a–76c identify the first source register of the graphics instruction. For the first graphics instruction format 68a, bits [13:5] (opf) 80 and bits [4:0] (rs2) 82a identify the op codes and the second source registers for a graphics instruction of that format. For the second and third graphics instruction formats 68b–68c, bits[13:5] (imm_asi) and bits [13:0] (simm_13), respectively, may optionally identify the ASI (address space identifiers). Lastly, for the second graphics instruction format 68b, bits[4:0] (rs2) further provide the second source register for a graphics instruction of that format (or a mask for a partial conditional store).

Logical Operations

1. Multiply/Add(Subtract).

Figure 7:
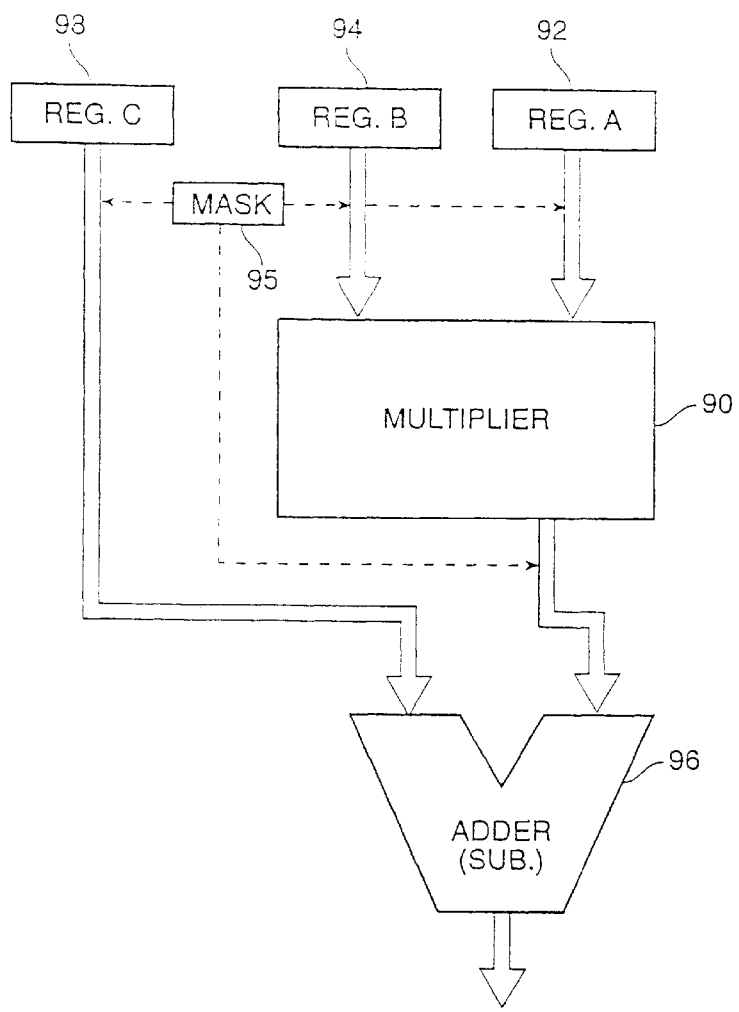
FIG. 7 is a diagram of the logic for doing a combined multiply and add.

In graphics operations, it is often necessary to do multiplication followed by an add or subtract operation on multiple pixel values. For instance, it may be desirable to scale pixel values by a fixed amount in a multiplication operation and also add an offset value to change the position in three dimensional space. Accordingly, the present invention provides a single instruction which does both the multiply and add (or subtract) operation utilizing separate operands. As illustrated in FIG. 7, a multiplier 90 receives inputs from registers 92 and 94. Register 92 could be a source register, containing multiple partitioned pixel values. Register 94 could contain a scale factor, for instance. The result of the multiplication is added in an adder/subtractor 96 with a value from a register 98 (as opposed to adding together partitioned fields of the multiply result as done in the Intel MMX instruction). The value in register 98 could be an offset, for instance.

In one example of an instruction format, format 68a in FIG. 6b could be used with RD indicating the partitioned pixel values in register 92, RS1 indicating the scale factor of register 94 and RS2 indicating the offset value of register 98 (note that one register, RD, is used for both a source and a destination).

The results of the operation are stored in a destination register designated by RD. Each pixel value may be truncated or saturated to fit within its corresponding field in the destination register after being multiplied.

Mask register 95 may be used to mask designated partitioned fields in any of the three operands, or in the intermediate output of multiplier 90.

Preferably, no rounding is done on the intermediate multiplication results. This eliminates one rounding stage compared to a two instruction approach, saving additional execution time.

2. One Divided by Square Root.

Figure 8A:
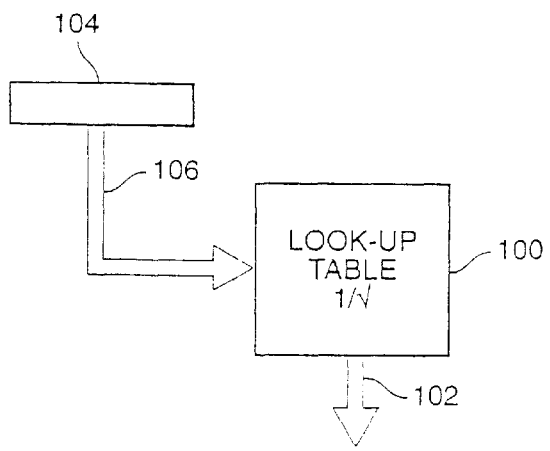
FIG. 8A is a diagram of the logic for providing a divide by the square root.

It is often necessary in graphical operations to determine the square root of a number and then compute its inverse (1/X). For example, a number of trigonometric functions used in graphics operations require this. X is typically a pixel value or a pixel address. Typically, square root operations, as well as divide operations, require multiple iterative passes through appropriate logic to perform the operation to the desired precision. However, where a packed pixel format is used, there are a limited number of bits for each pixel to be divided or have the square root calculated. Accordingly, it is feasible to simply use a lookup table to provide a value equal to one over the square root of the pixel value. Such a lookup table is illustrated as Table 100 in FIG. 8A, which provides on an output 102 the value of one divided by the square root of the pixel value. The input is provided from a source register 104 over a bus 106. The table could be structured to provide multiple outputs in parallel, or the partitioned values from register 104 could be sequentially provided to the lookup table, and then the results could be sequentially entered into the appropriate fields of a destination register. Alternately, an iterative operation could be used, with one set of iterations for the combined operation saving time compared to 2 sets of iterative operations to do the divide and square root operations separately.

3. A+ABS. [B].

Often times in graphical applications, it is desirable to calculate the combination of a pixel value with an absolute value. For example, this is used in motion estimation and detection. This operation is carried out in parallel for the multiple partitioned pixel values in a source register. The logic to calculate the absolute value or to perform the 2's complement of the 2nd operand depends on the sign bit of the 2nd operand.

Figure 8B:
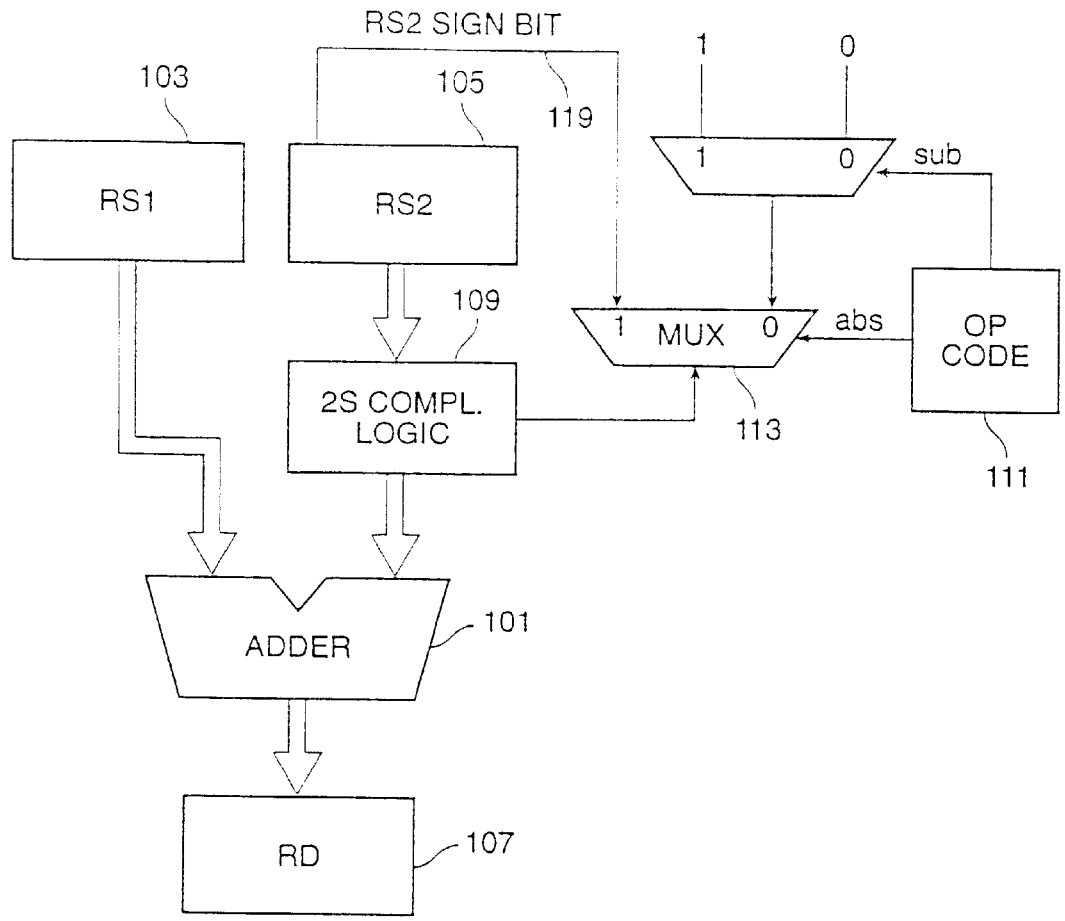
FIG. 8B is a diagram of the logic for providing A+ABS [B].

FIG. 8B illustrates one example of logic for implementing the addition of a value with the absolute value of a second value. The logic shown would be for one of the partitioned pixel fields, and would be repeated for each of the pixel fields. An adder 101 receives the value A from register RS1 (103) and the absolute value of B from register RS2 (105), with the result being provided to RD destination register 107. The value of B is converted to its absolute value by two's complement logic 109.

The absolute value determination is activated by decoding the opcode 111, which controls multiplexors 113 and 115. If it is an ordinary add, the "0" input to multiplexors 113 and 115 are selected. If it is an ordinary subtract, the "1" input to multiplexor 115 and the "0" input to multiplexor 113 are selected. If the absolute value is to be added, the "1" input of multiplexor 113 is selected. The RS2 sign bit 119 will provide either a one or a zero depending on the value of the RS2 sign bit for the partitioned field on line 119.

Data Movement Operations

1. Partitioned Field Extraction.

Figure 9A:
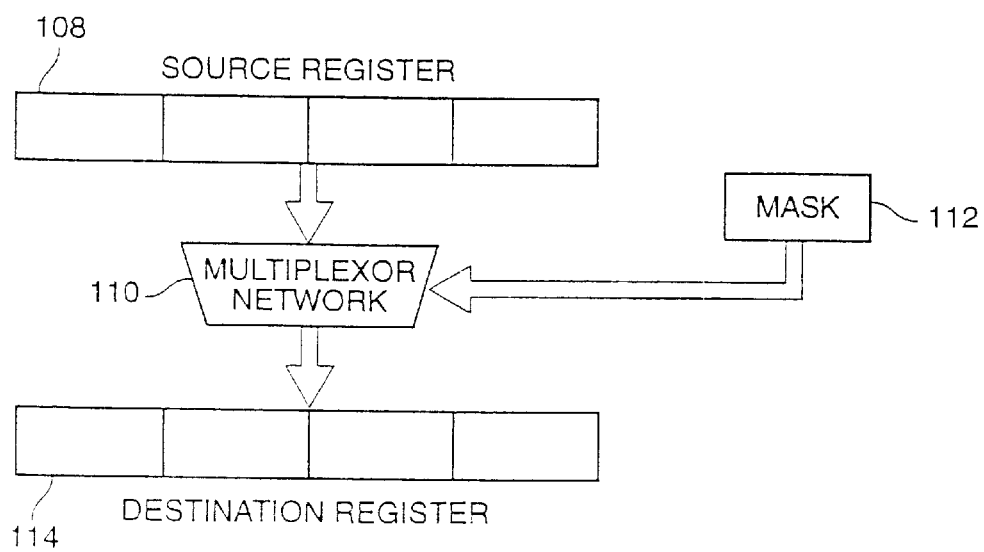
FIGS. 9A, 9B, and 9C are diagrams illustrating the selective extraction of data from certain partitioned fields, and a conditional merge operation.

In a number of graphics applications, it is desirable to be able to pick out designated pixels to move or perform operations on. Because the pixels are packed so that a plurality of pixels are in a single register, standard operations will not accomplish this unless the pixels are unpacked. The present invention provides an instruction and logic for selectively moving fields from a source to a destination register, and selectively operating on the data in such fields. As shown in FIG. 9A, a source register 108 with multiple fields is connected to a multiplexor network 110 which passes designated fields indicated by a mask register 112 into a destination register 114.

Figure 9B:
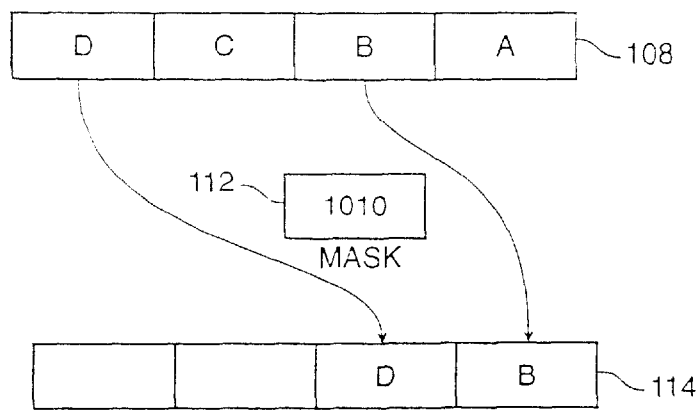

FIG. 9B illustrates one example in which the letters A, B, C and D indicate pixel values in source register 108. A mask register has a value 1010, with the one values indicating that the field should be passed to destination register 114. As can be seen, the one values correspond to pixel values B and D, which are then passed into the least significant positions of destination register 114.

In addition to a move instruction, pixel values could be selectively loaded into registers from memory in this manner. In addition, pixel values could be selectively operated on (such as a multiplication or add operation) in this manner.

An instruction for performing an operation on selected pixels could be performed with two op codes. The first op code would set the mask value, and the second op code would specify, for example, a move and add operation, with a first register being designated as the source register and a second register being designated as the value to be added to each of the selected pixel values from the source register.

Figure 13:
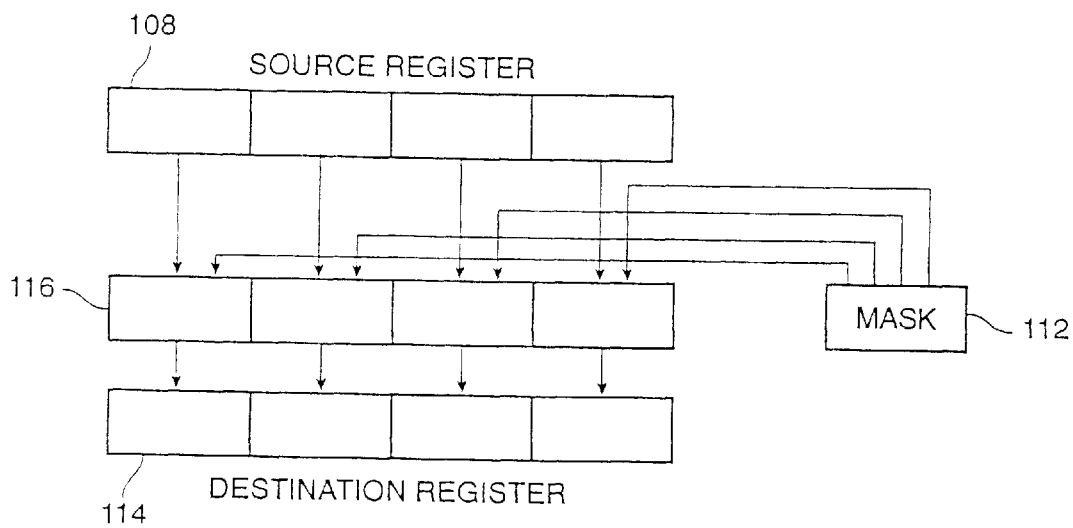
FIG. 13 is a diagram illustrating logic for a selective move of particular partitioned fields.

While FIGS. 9A and 9B illustrate a simple extraction instruction, FIG. 13 illustrates the selection of a particular field using the mask register along with optionally performing an arithmetic or logical operation on the individual fields. As shown in FIG. 13, the contents of a source register 108 is provided through logic 116 to destination register 114. Mask 112 enables or disables the logic blocks in 116 which could, for example, perform an add operation. Alternately, the working of the portions of the destination register designated by the mask could be disabled, or any other mechanism for masking could be used. In the embodiment of FIG. 13, the selected pixel values are provided to the corresponding locations in the destination register, rather than being packed into the least significant fields as in the embodiment of FIG. 9B.

Figure 9C:
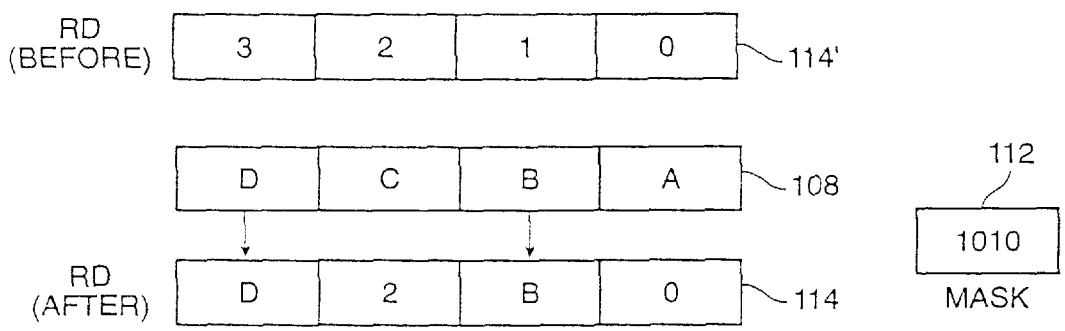
Figure 10A:
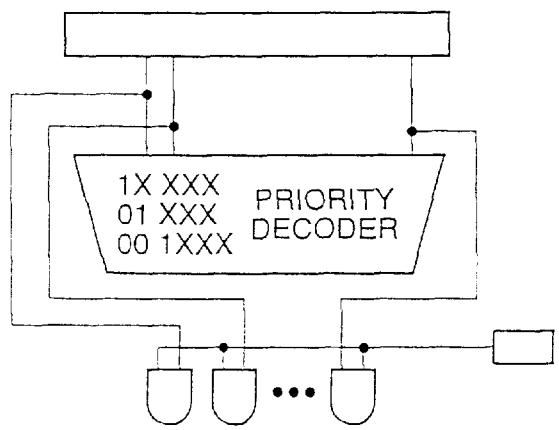
FIGS. 10A and 10B are diagrams illustrating two embodiments for detecting a leading one or zero.
Figure 10B:
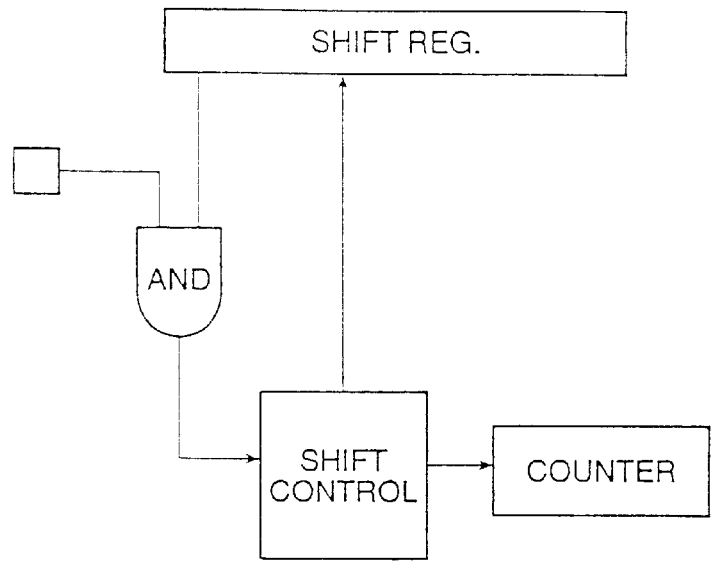

FIG. 9C is a diagram of a conditional merge operation. As shown, portions of register 114 are merged with portions of register 108, with mask 112 indicating which partitioned fields of register 108 will overwrite fields of register 114. The fields of register 114 not overwritten will remain unchanged.

2. Floating Point/Graphics Register File and Integer Register File Exchange.

Figure 11:
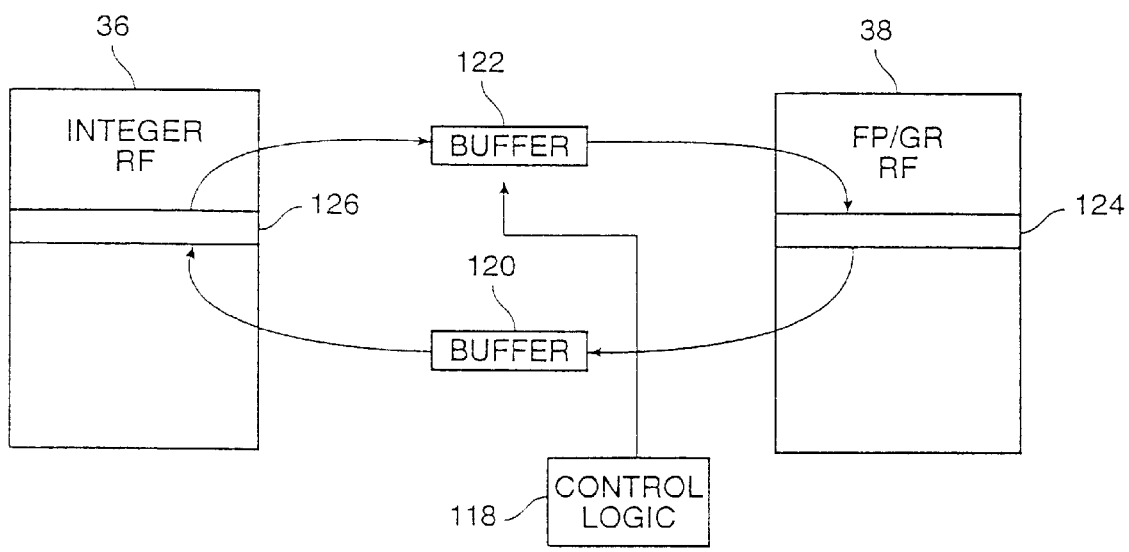
FIG. 11 is a diagram illustrating the swapping of register contents between an integer and floating point/graphics register file.

FIG. 11 illustrates logic for executing an instruction to exchange data between the integer register file 36 and the floating point/graphics register file 38. Control logic 118 acts to enable buffers 120 and 122 for transferring the data. Buffer 120 is used to buffer the data contents of a register 124 from the floating point/graphics register file which is to be transferred to the integer register file. Similarly, buffer 122 temporarily stores the contents of a register 126 from integer register file 36 to be transferred to floating point/graphics register file 38. In addition to swapping the contents of two registers, alternately an instruction could cause one register's contents to simply be moved to an empty register or overwrite another register in the other register file. This operation eliminates the need to write to memory and then load from memory into the separate register file for operations where a calculation is done in one register file, with the results being needed for the other register file. For example, an address may be calculated using the floating point/ graphics execution unit, with the results stored in the floating point/graphics register file. It may then be desirable to use the address in the integer execution unit, and this operation can be used to accomplish the transfer.

A swap between the register files may be required for rendering operations, for example. A value to be added or subtracted may need to be moved from the floating point register file to the integer register file so that it can be accessed by load and store operations for use as an offset for address calculations.

3. Partitioned Shift.

Figure 12:
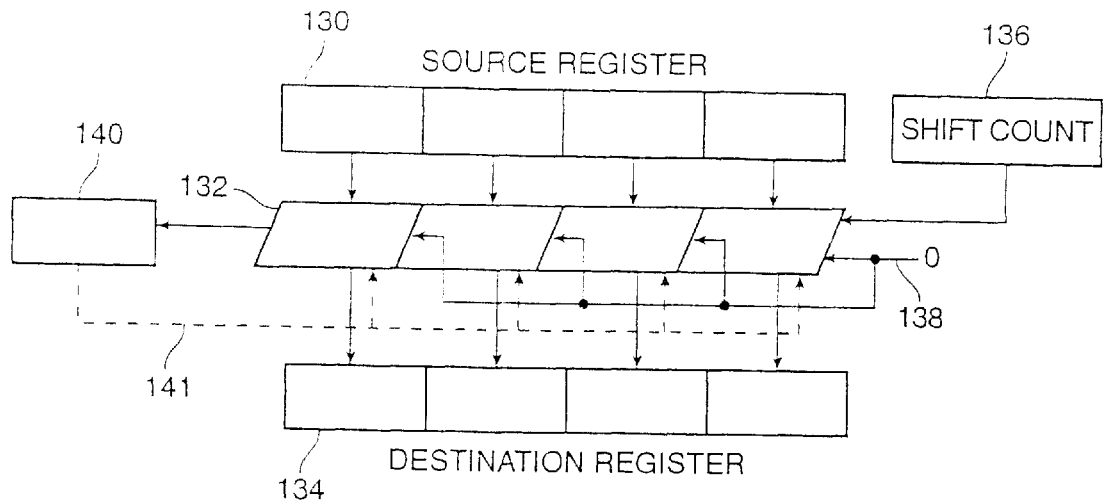
FIG. 12 is a diagram illustrating a partitioned shift logic.

FIG. 12 illustrates logic for supporting a partitioned shift operation. Here, multiple pixel values in a single register are each shifted within their partitioned field. Source register 130 provides a partitioned field to shift logic 132, with the result being placed in the corresponding partitioned fields of a destination register 134. A shift counter 136 determines the amount of shift. Alternately, the amount of shift could be imbedded or implicit from the opcode or stored in a field of the GSR register. As shown by arrow 138, a value of zero is shifted left into each partitioned field. Optionally, the bit shifted out can be provided to a mask or control register 140. Register 140 could be used, for instance, to set a flag indicating that a shift has occurred. Alternately, mask 140 is used to select, via the dotted control lines 141, which of the partitioned fields are to be shifted.

A right shift operation could also be done for logical or arithmetic operations. For arithmetic operations, the sign bit can be repeatedly inserted as the bits are shifted.

Memory Access Operations

1. Load and Address Increment.

The present invention provides a load operation that also increments the address register. This saves the need for a separate instruction to increment the address register. This is significant since often graphics operations proceed literally through a large volume of data, with an increment repeatedly being necessary. The load is done to a graphics register, preferably in a graphics/floating point register file. The load can include multiple partitioned fields by specifying the appropriate address increment, which may depend on the data size. An entire register (e.g., 64 bits) could be loaded at one time, or one or multiple partitioned fields could be loaded.

Figure 14:
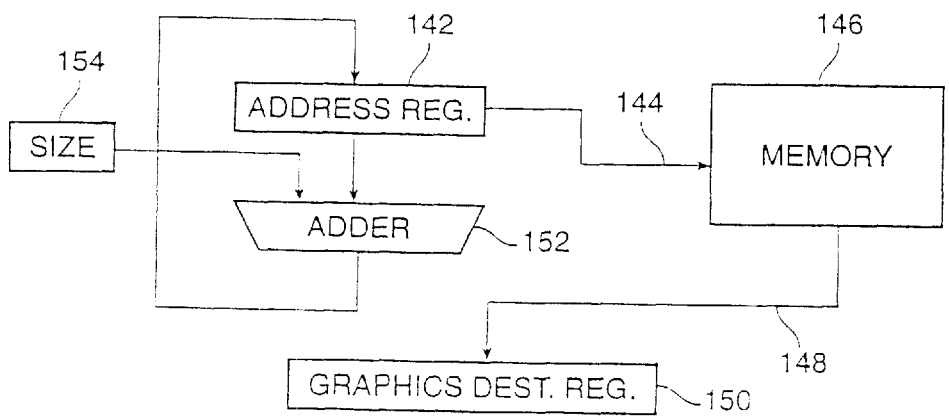
FIG. 14 is a logic diagram illustrating logic for executing a combined load and address incrementing instruction.

FIG. 14 illustrates one embodiment of circuitry for supporting the load and increment instruction. An address register 142 is shown which provides an address on lines 144 to memory 146. The addressed data from memory 146 is provided on input lines 148 (which may be the same bus as 144) to a graphics destination register 150. In addition, an adder 152 provides its output back to the input of address register 144 to provide the increment operation, with the size of the increment being indicated by a value in a register 154.

As will be understood by those with skill in the art, the present invention may be embodied in other specific forms without departing from the spirit or essential characteristics thereof. Accordingly, the foregoing embodiments are intended to be illustrative, but not limiting, of the scope of the invention which is set forth in the following claims.

What is claimed is:

1. A microprocessor for performing both graphics and non-graphics operations, comprising:

a source register; and divide and square-root logic having an input coupled to said source register and to a pipeline bus said divide and square root logic configured to determine the value of one divided by the square root of each of a plurality of values in said source register in parallel; and a floating point graphics multiply unit coupled to the pipeline bus.

2. The microprocessor of claim 1 wherein said divide and square-root logic comprises a look-up table.

3. The microprocessor of claim 1 wherein said divide and square-root logic comprises iterative logic.

4. The microprocessor of claim 1, further comprising:

a floating point graphics arithmetic logic unit coupled to the pipeline bus.

5. The microprocessor of claim 4, further comprising:

a graphics status register coupled to both the floating point graphics arithmetic logic unit and the floating point graphics multiply unit.

6. A computer readable memory accessible by a microprocessor for performing both graphics and non-graphics operations, comprising:

an OPcode instruction configured to cause said microprocessor to perform a determination of the value of one divided by the square-root of each of a plurality of partitioned fields of an input source register in parallel; and an OPcode instruction configured to cause said microprocessor to perform a plurality of graphics data packing instructions.

* * * * *